United States Patent [19]

Mrozowski

[11] Patent Number: 5,104,176

[45] Date of Patent: Apr. 14, 1992

[54] VEHICLE FLOOR CONSTRUCTION WITH FLUSH MOUNTED SEAT RAILS

[75] Inventor: Joseph E. Mrozowski, Del Mar, Calif.

[73] Assignee: Nissan Design International, Inc., San Diego, Calif.

[21] Appl. No.: 742,295

[22] Filed: Aug. 8, 1991

[51] Int. Cl.$^5$ ............................................... B60N 1/08
[52] U.S. Cl. ..................................... 296/187; 296/65.1
[58] Field of Search ................. 296/65.1, 204, 187; 297/311, 344, 340, 341; 428/429, 430

[56] References Cited

U.S. PATENT DOCUMENTS

| | | | |
|---|---|---|---|
| 1,716,316 | 6/1929 | Lanning | 296/65.1 |
| 4,015,877 | 4/1977 | Button | 297/341 |
| 4,157,797 | 6/1979 | Fox | 296/65.1 X |
| 4,422,690 | 12/1983 | Kopich | 297/341 |
| 4,607,884 | 8/1986 | Heling | 297/341 |
| 4,671,571 | 6/1987 | Gionet | 297/341 |
| 4,707,030 | 11/1987 | Harding | 297/341 |
| 4,725,032 | 2/1988 | Kazaoka | 248/430 |
| 4,863,289 | 9/1989 | Lecerf | 384/47 |
| 4,936,535 | 6/1990 | Johansson | 297/344 |
| 5,011,209 | 8/1991 | Takarabe et al. | 296/65.1 |

Primary Examiner—Margaret A. Focarino
Assistant Examiner—Joseph D. Pape
Attorney, Agent, or Firm—Baker, Maxham, Jester & Meador

[57] ABSTRACT

A vehicle floor construction includes a primary floor panel having a portion defining an upwardly opening longitudinal rail channel. A secondary floor panel overlies an outboard portion of the primary floor panel and has a raised and curved inner section that partially encloses the rail channel except for an access slot defined between the primary and secondary floor panels. An upwardly opening rail is mounted in the rail channel. A wheeled truck is seated in the rail for longitudinal rolling movement therein. A seat support bracket connected to the truck has a portion which extends through the access slot defined between the primary and secondary floor panels. A resilient, compressible pad and a carpet panel overlie the secondary floor panel and extend above the primary floor panel a distance substantially equal to the height of the raised inner section of the secondary floor panel.

11 Claims, 1 Drawing Sheet

VEHICLE FLOOR CONSTRUCTION WITH FLUSH MOUNTED SEAT RAILS

BACKGROUND OF THE INVENTION

The present invention relates to motor vehicles, and more particularly, to an improved floor construction that has hidden seat rails which permit longitudinal sliding of the seats.

In most automobiles the driver and front passenger seats are each slideable along a pair of longitudinal rails that are bolted to the floor board of the car body and extend a substantial distance above the carpet. In many cases the seat rails are partially exposed and are not covered entirely by the seat. They can be tripped over by a person entering or leaving the automobile and they can also tear a person's shoes. In some cases the seat rails have telescoping sections to increase the range of forward travel to minimize the extension of the seat rails into the foot area in front of the seat. Such an arrangement only partially alleviates the obstruction problem. It is desirable for multipurpose vans and utility vehicles to have removable seats to increase the cargo carrying capacity. In such cases, the seats are normally mounted in stationary releasable mounts so that there are no obstructing rails when the seats are removed. It would be desirable to have slideable seats which could be removed without leaving raised rails that prevent or inhibit the sliding of cargo over the resulting cargo bay. Any floor construction affording this advantage must be readily adaptable to the stamped sheet metal floor construction prevalent in today's uni-body construction.

U.S. Pat. No. 4,015,877 of Button discloses a vehicle seat assembly with telescoping rails. These rails appear to be entirely mounted above the floor of the vehicle according to FIG. 1 of the patent.

U.S. Pat. No. 4,157,797 of Fox discloses an aircraft floor construction in FIG. 2 in which the wheels of the chairs roll in upwardly opening tracks 18 and 20 which extend continuously along the floor of the fuselage and accommodate multiple seats.

U.S. Pat. No. 4,422,690 of Kopich discloses a vehicle seat assembly in which telescoping track members are entirely supported above the floor pan 30.

U.S. Pat. No. 4,607,884 of Heling discloses another vehicle seat assembly which includes telescoping track members 30 and 32 entirely supported above the floor 12 by brackets 34 and 36.

U.S. Pat. No. 4,671,571 of Gionet discloses another sliding seat arrangement in which the rails or tracks apparently extend above the floor.

U.S. Pat. No. 4,707,030 of Harding discloses a another sliding seat assembly in which the rails or tracks extend above the floor according to FIGS. 4-6 of the patent.

U.S. Pat. No. 4,725,032 of Kazakoa et al. discloses another sliding vehicle seat assembly including lower rails 14 which are apparently secured above the vehicle floor via brackets 16.

Finally, U.S. Pat. No. 4,863,289 of Lecerf discloses another sliding seat assembly which appears to be mounted above the floor of the vehicle shown broken away in FIG. 1 of the patent.

None of the patents referenced above provides a floor construction which eliminates the obstruction of the rails or other mechanisms which are utilized to slide the seat longitudinally.

SUMMARY OF THE INVENTION

It is therefore the primary object of the present invention to provide an improved motor vehicle floor construction that has hidden seat rails which permit longitudinal sliding of the seats.

According to the illustrated embodiment of the present invention a vehicle floor construction includes a primary floor panel having a portion defining an upwardly opening longitudinal rail channel. A secondary floor panel overlies an outboard portion of the primary floor panel and has a raised and curved inner section that partially encloses the rail channel except for an access slot defined between the primary and secondary floor panels. An upwardly opening rail is mounted in the rail channel. A wheeled truck is seated in the rail for longitudinal rolling movement therein. A seat support bracket connected to the truck has a portion which extends through the access slot defined between the primary and secondary floor panels. A resilient, compressible pad and a carpet panel overlie the secondary floor panel and extend above the primary floor panel a distance which is at least equal to the height of the raised inner section of the secondary floor panel.

DESCRIPTION OF THE PREFERRED EMBODIMENT

Figure 1:
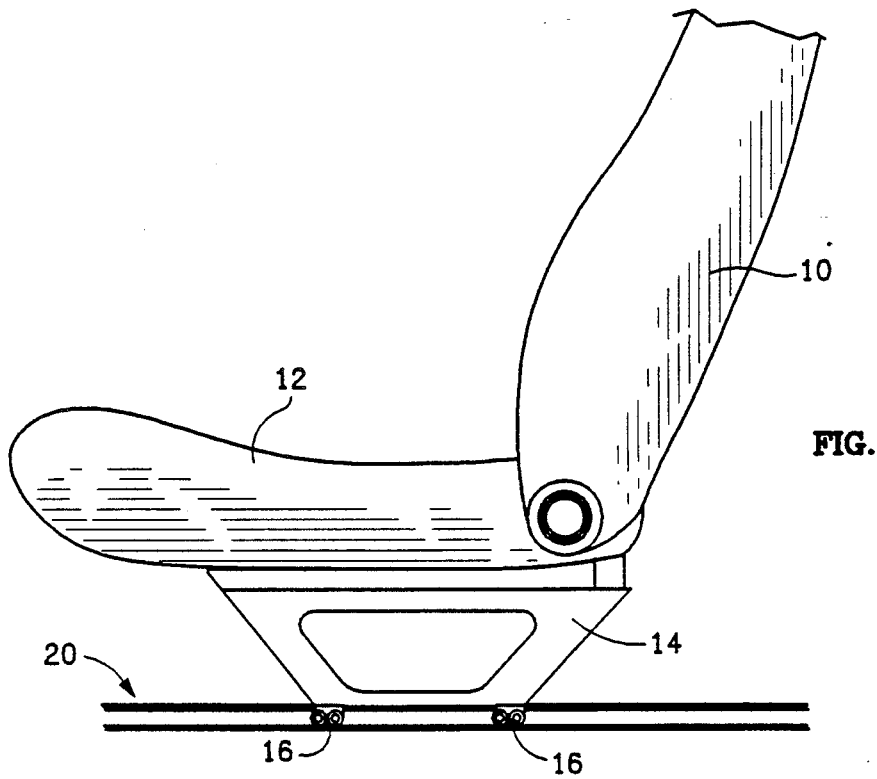
FIG. 1 is a fragmentary side elevation view of a passenger seat mounted for longitudinal sliding motion over a floor construction (shown in section) of a vehicle having hidden or recessed rails in accordance with a preferred embodiment of the present invention.

Referring to FIG. 1, a vehicle seat includes a back rest 10, a seat cushion 12 and a frame including a pair of side pieces 14. Each of the side pieces is supported for longitudinal sliding motion by a pair of wheeled trucks 16. The wheeled trucks roll in rails hidden in the floor construction 20 of the vehicle.

Figure 2:
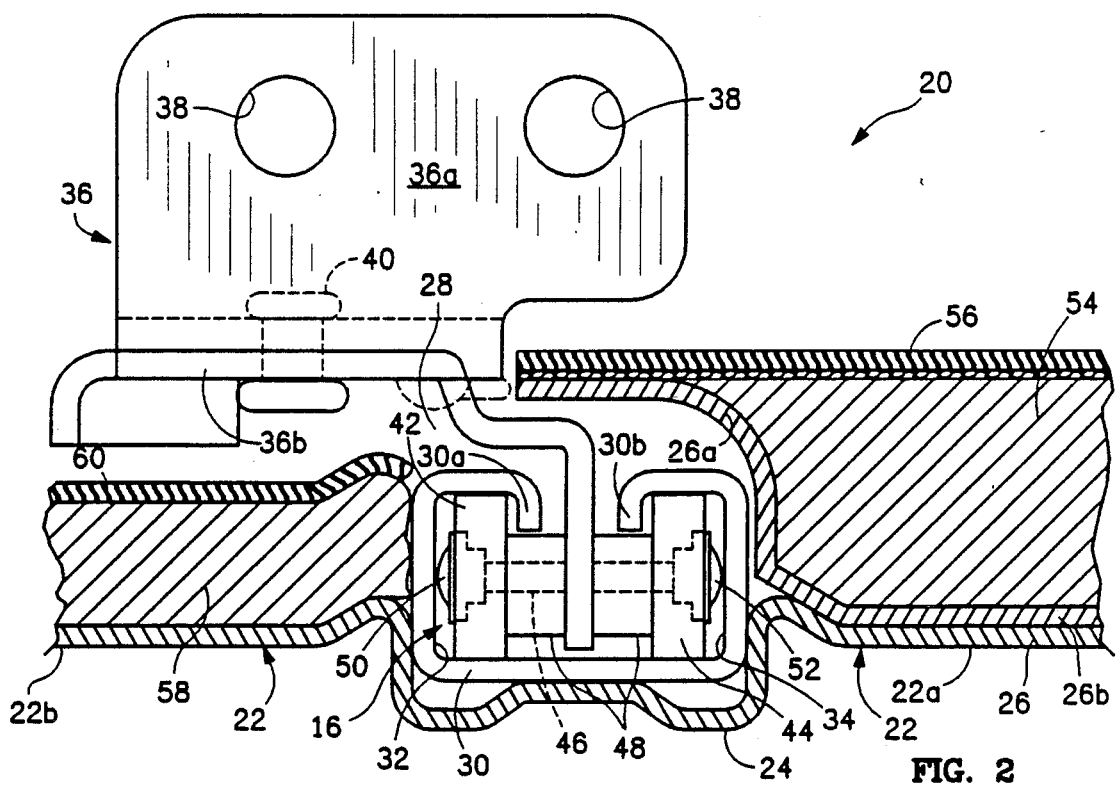
FIG. 2 is an enlarged, fragmentary cross-sectional view of the floor construction of FIG. 1 illustrating details of the preferred embodiment of the present invention.

Details of the floor construction 20 are illustrated in FIG. 2. It includes a primary floor panel 22 having a generally W-shaped recessed portion defining an upwardly opening longitudinal rail channel 24. A secondary floor panel 26 overlies an outboard portion 22a of the primary floor panel and has a raised and curved inner section 26a. This inner section partially encloses the rail channel 24 except for an access slot 28 defined between the primary and secondary floor panels. The raised inner section 26a extends to a predetermined height above the outboard portion 22a of the secondary floor panel. The panels 22 and 26 may be made of stamped sheet steel of appropriate gauge and may be spot welded together.

An upwardly opening rail 30 is mounted in the rail channel 24. This rail defines a pair of guide tracks 32 and 34 including downwardly directed guide pieces 30a and 30b. The rail 30 may be made of steel and may be spot welded to the rail channel 24. A seat support bracket 36 has an upwardly extending planar portion 36a with holes 38 therein for receiving bolts (not illustrated) to connect the same to the side pieces 14 of the seat frame. The upper portion of the seat bracket is held via rivets 40 to a generally L-shaped lower portion 36b. The outboard end of the lower portion 36b of the seat bracket extends through the access slot 28 and is connected to one of the trucks 16. This truck is seated in the rail 30 for longitudinal rolling movement therein. The truck includes a pair of wheels 42 and 44 mounted to opposite ends of an axle 46 journaled through the downwardly extending leg of lower portion 36b of the seat bracket. The wheels 42 and 44 roll within and along the guide tracks 32 and 34. The wheels are held in proper alignment by cylindrical spacers 48 which surround the axle 46 on opposite sides of the leg of the bracket portion 36b. The wheels are held on by caps 50 and 52 fixed over opposite ends of the axle 46.

A resilient, compressible pad 54 overlies the outboard section 26b of the secondary floor panel. A carpet panel 56 overlies the pad 54. The thickness of the pad 54 and carpet panel 56 are selected so that in combination they extend above the top of the raised inner section 26a of the secondary floor panel. Similarly, another pad 58 and carpet panel 60 overlie the inboard portion 22b of the primary floor panel.

While I have described a preferred embodiment of my vehicle floor construction, it should be understood that modifications and adaptations thereof will occur to persons skilled in the art. For example, the access slot 28 (FIG. 2) could be surrounded by a plastic gasket that would permit sliding motion of the bracket 36 in the slot yet seal the slot to prevent debris from falling therein. Therefore, the protection afforded my invention should only be limited in accordance with the scope of the following claims.

I claim:

1. A vehicle floor construction, comprising:
   a primary floor panel having a portion defining an upwardly opening longitudinal rail channel;
   a secondary floor panel overlying an outboard portion of the primary floor panel and having a raised inner section that partially encloses the rail channel except for an access slot defined between the primary and secondary floor panels;
   an upwardly opening rail mounted in the rail channel;
   a wheeled truck seated in the rail for longitudinal rolling movement therein;
   a seat support bracket connected to the truck and having a portion extending through the access slot defined between the primary and secondary floor panels;
   a resilient, compressible pad overlying the secondary floor panel; and
   a carpet panel overlying the resilient compressible pad.

2. A vehicle floor construction according to claim 1 wherein the raised inner section of the secondary floor panel is curved.

3. A vehicle floor construction according to claim 1 wherein the rail has a pair of guide tracks including downwardly directed guide pieces.

4. A vehicle floor construction according to claim 3 wherein the truck includes a pair of wheels mounted to opposite ends of an axle journaled through a downwardly extending leg of the bracket and each wheel rolls within corresponding ones of the guide tracks.

5. A vehicle floor construction according to claim 1 wherein the raised inner section of the secondary floor panel extends above the primary floor panel to a predetermined height.

6. A vehicle floor construction according to claim 5 wherein the pad and carpet panel extend above the outboard portion of the primary floor panel to at least the predetermined height.

7. A vehicle floor construction according to claim 1 wherein the seat support bracket has an upwardly extending planar portion for attachment to a seat frame.

8. A vehicle floor construction according to claim 1 wherein the rail channel has a generally W-shaped cross-section.

9. A vehicle floor construction according to claim 1 wherein the seat support bracket has a generally L-shaped lower portion that extends through the access slot defined between the primary and secondary floor panels and a planar upper portion with holes therethrough for receiving bolts to attach the bracket to a seat frame.

10. A vehicle floor construction according to claim 1 wherein the primary and secondary floor panels are made of stamped sheet metal which is spot welded together.

11. A vehicle floor construction, comprising:
    a primary floor panel having a recessed portion defining an upwardly opening longitudinal rail channel;
    a secondary floor panel overlying an outboard portion of the primary floor panel and having a raised and curved section that partially encloses the rail channel except for an access slot defined between the primary and secondary floor panels, the inner section extending to a predetermined height above the outboard portion of the secondary floor panel;
    an upwardly opening rail mounted in the rail channel, the rail having a pair of guide tracks including downwardly directed guide pieces;
    a seat support bracket connected to the truck and having a first upwardly extending portion for attachment to a seat frame and a second portion extending through the access slot defined between the primary and secondary floor panels and into the rail;
    a truck seated in the rail for longitudinal rolling movement therein, the truck including a pair of wheels mounted to opposite ends of an axle journaled through a downwardly extending leg of second portion of the bracket, and each wheel rolling within corresponding ones of the guide tracks;
    a resilient, compressible pad overlying the secondary floor panel;
    a carpet panel overlying the resilient compressible pad; and
    the pad and carpet panel extending above the outboard portion of the primary floor panel to at least the predetermined height.

* * * * *